(12) United States Patent
Cho et al.

(10) Patent No.: US 10,378,927 B2
(45) Date of Patent: Aug. 13, 2019

(54) DIRECTION DETECTION DEVICE

(71) Applicant: LG INNOTEK CO., LTD., Seoul (KR)

(72) Inventors: Won Keun Cho, Seoul (KR); Jeong Han Kim, Seoul (KR); Bi Yi Kim, Seoul (KR); Hyun Gyu Park, Seoul (KR); In Hee Cho, Seoul (KR); Seung Kwon Hong, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 15/744,240

(22) PCT Filed: Mar. 15, 2016

(86) PCT No.: PCT/KR2016/002542
§ 371 (c)(1),
(2) Date: Jan. 12, 2018

(87) PCT Pub. No.: WO2017/010653
PCT Pub. Date: Jan. 19, 2017

(65) Prior Publication Data
US 2018/0202840 A1 Jul. 19, 2018

(30) Foreign Application Priority Data
Jul. 16, 2015 (KR) .................. 10-2015-0101061

(51) Int. Cl.
*G01D 5/24* (2006.01)
*G06F 3/044* (2006.01)
(Continued)

(52) U.S. Cl.
CPC ............. *G01D 5/2405* (2013.01); *G01D 5/24* (2013.01); *G08B 13/10* (2013.01); *G08B 21/18* (2013.01); *G06F 3/044* (2013.01)

(58) Field of Classification Search
None
See application file for complete search history.

(56) References Cited

U.S. PATENT DOCUMENTS

2010/0253617 A1* 10/2010 Iio .................. G06F 3/03548
345/156
2011/0109583 A1 5/2011 Lee
(Continued)

FOREIGN PATENT DOCUMENTS

KR 10-2008-0064100 7/2008
KR 10-2012-0098749 9/2012
(Continued)

OTHER PUBLICATIONS

International Search Report (with English Translation) and Written Opinion dated Jun. 21, 2016 issued in Application No. PCT/KR2016/002542.

*Primary Examiner* — Thomas S McCormack
(74) *Attorney, Agent, or Firm* — Ked & Associates, LLP

(57) ABSTRACT

A direction detection device, according to one embodiment of the present invention, comprises: a dielectric layer; a first electrode layer which is arranged on a first surface of the dielectric layer, and which comprises a plurality of first electrode patterns arranged in a first direction; a second direction arranged on a second surface of the dielectric layer, which faces the first surface; a capacitance detection unit which detects changes in capacitance due to time difference between a first region and a second region, wherein in the first region, at least one selected among the plurality of first electrode patterns overlaps the second electrode layer, and in the second region, at least one selected from the plurality of the remaining first electrode patterns overlaps the second electrode layer; and a direction detection unit which connects to the capacitance detection unit, and detects a movement direction on the basis of the time difference between the first region and the second region.

20 Claims, 20 Drawing Sheets

(51) Int. Cl.
*G08B 13/10* (2006.01)
*G08B 21/18* (2006.01)

(56) References Cited

U.S. PATENT DOCUMENTS

| | | | | |
|---|---|---|---|---|
| 2013/0215035 A1* | 8/2013 | Guard | ................... | G06F 3/0221 345/168 |
| 2014/0139761 A1* | 5/2014 | Yanagawa | ............... | G06F 3/044 349/12 |
| 2015/0177298 A1* | 6/2015 | Sugiura | ................... | G06F 3/044 324/658 |
| 2015/0330112 A1* | 11/2015 | Van Wiemeersch | .... | E05B 81/76 292/201 |

FOREIGN PATENT DOCUMENTS

| | | |
|---|---|---|
| KR | 10-1211121 | 12/2012 |
| KR | 10-2013-0109090 | 10/2013 |
| WO | WO 2011/053656 | 5/2011 |
| WO | WO 2011/156447 | 12/2011 |

\* cited by examiner

DIRECTION DETECTION DEVICE

CROSS-REFERENCE TO RELATED PATENT APPLICATIONS

This application is a U.S. National Stage Application under 35 U.S.C. § 371 of PCT Application No. PCT/KR2016/002542, filed Mar. 15, 2016, which claims priority to Korean Patent Application No. 10-2015-0101061, filed Jul. 16, 2015, whose entire disclosures are hereby incorporated by reference.

TECHNICAL FIELD

The present invention relates to a direction detection device, and more particularly, to a sheet or mat type direction detection device.

BACKGROUND ART

Since a direction detection function has been applied to apparatuses such as displays, vehicles, and electronic devices generally as an add-on, the performing of additional functions has been limited.

However, direction detection apparatuses have recently been required in not only household safety devices but also in various application fields. For example, when a direction detection device is installed at an entrance of a building, whether a person is present in the building is detected so that the building's electricity, gas, and the like may be automatically shut off.

However, there is a limitation in developing a new direction detection technology.

DISCLOSURE

Technical Problem

The present invention is directed to a direction detection device capable of performing a direction detection function using a change in capacitance.

Technical Solution

One aspect of the present invention provides a direction detection device including a capacitance detection unit including a dielectric layer, a first electrode layer disposed on a first surface of the dielectric layer and including a plurality of first electrode patterns disposed in a first direction, and a second electrode layer disposed on a second surface of the dielectric layer opposite the first surface, and configured to detect changes in capacitance at different times in a first region in which at least one selected from among the plurality of first electrode patterns overlaps the second electrode layer and in a second region in which at least one selected from among a plurality of remaining first electrode patterns overlaps the second electrode layer, and a direction detection unit connected to the capacitance detection unit and configured to detect a movement direction on the basis of the different times between the first region and the second region.

The direction detection unit may compare the first region in which the capacitance was changed at a first time (T1) and the second region in which the capacitance was changed at a second time (T2>T1) and determine that an object moved from the first region toward the second region.

Another aspect of the present invention provides an entering and leaving detection apparatus including a capacitance detection unit including a dielectric layer, a first electrode layer disposed on a first surface of the dielectric layer and including a plurality of first electrode patterns disposed in a first direction, and a second electrode layer disposed on a second surface of the dielectric layer opposite the first surface, and configured to detect changes in capacitance at different times in a first region in which at least one selected from among the plurality of first electrode patterns overlaps the second electrode layer and in a second region in which at least one selected from among a plurality of remaining first electrode patterns overlaps the second electrode layer, a direction detection unit connected to the capacitance detection unit and configured to detect a movement direction on the basis of the different times between the first region and the second region, and a control unit configured to output a control signal based on the movement direction.

The first direction may intersect with a movement direction.

Advantageous Effects

A direction detection device according to the embodiment of the present invention has the following effects.

First, a movement direction of an object can be detected by comparing at least two regions in which capacitances between first and second electrodes are changed at different times.

Second, adults and children can be distinguished according to pressures applied to a capacitance detection unit in which capacitances change.

MODES OF THE INVENTION

Figure 1:
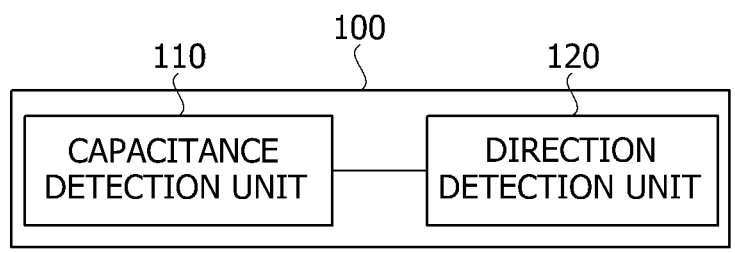
FIG. 1 is a block diagram illustrating a direction detection device according to the present invention.

While the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims.

It should be understood that, although the terms "first," "second," and the like may be used herein to describe various elements, these elements are not limited by these terms. These terms are only used to distinguish one element from another. For example, a first element could be termed a second element, and, similarly, a second element could be termed a first element without departing from the scope of the present invention. As used herein, the term "and/or" includes any and all combinations of one or more of the associated listed items.

It should be understood that, when an element is referred to as being "connected" or "coupled" to another element, the element can be directly connected or coupled to the other element or intervening elements may be present. Conversely, when an element is referred to as being "directly connected" or "directly coupled" to another element, there are no intervening elements.

The terms used in the present specification are merely used to describe exemplary embodiments, and are not intended to limit embodiments. An expression used in the singular encompasses the expression of the plural, unless it has a clearly different meaning in the context. In the present specification, it should be understood that the terms such as "including," "having," and "comprising" are intended to indicate the existence of features, numbers, steps, actions, components, parts, or combinations thereof disclosed in the specification, and are not intended to preclude the possibility that one or more other features, numbers, steps, actions, components, parts, or combinations thereof may exist or be added.

Unless otherwise defined, all terms including technical and scientific terms used herein should be interpreted as is customary in the art to which this invention belongs. It should be further understood that terms in common usage should also be interpreted as is customary in the relevant art and not in an idealized or overly formal sense unless expressly so defined herein.

Hereinafter, embodiments will be illustrated in detail with reference to the accompanying drawings, and components that are the same or correspond to each other regardless of reference numerals will be referred to by the same or similar reference numerals, and redundant descriptions thereof will be omitted.

Hereinafter, a direction detection device according to the embodiments will be described in detail with reference to the accompanying drawings.

Figure 2A:
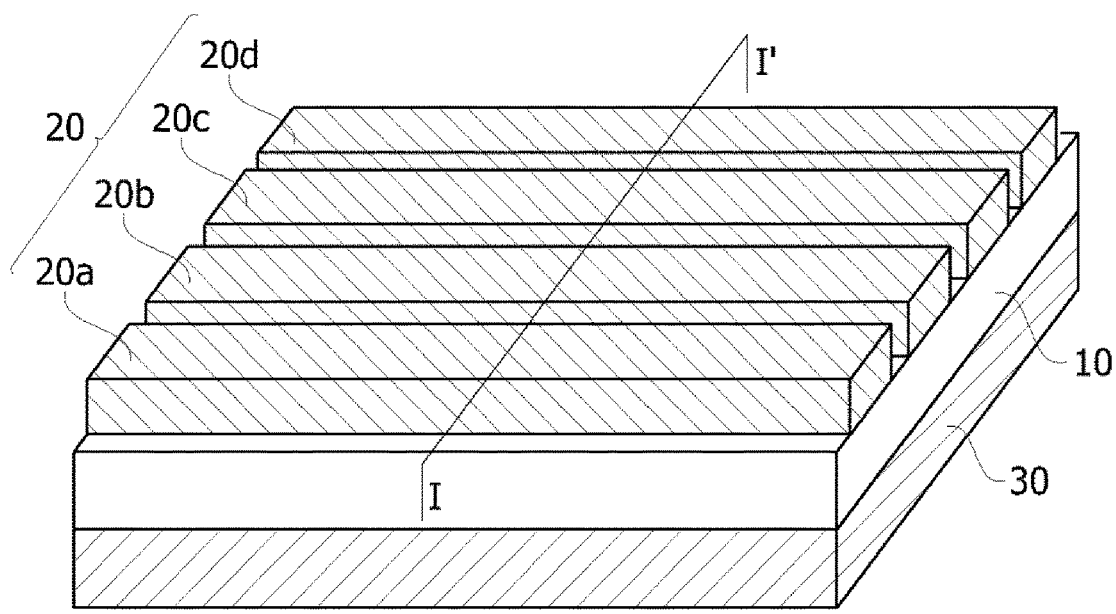
FIG. 2A is a perspective view illustrating a capacitance detection unit according to one embodiment of the present invention.
Figure 2B:
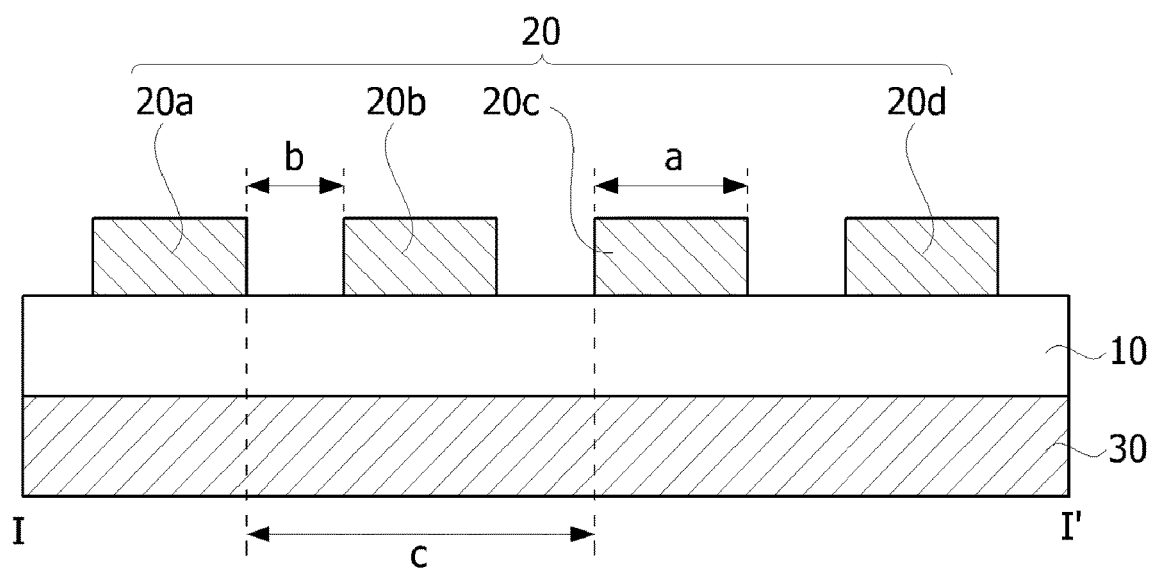
FIG. 2B is a cross-sectional view taken along line I-I' of FIG. 2A.

FIG. 1 is a block diagram illustrating a direction detection device according to one embodiment of the present invention, FIG. 2A is a perspective view illustrating a capacitance detection unit according to one embodiment of the present invention, and FIG. 2B is a cross-sectional view taken along line I-I' of FIG. 2A.

As illustrated in FIG. 1, a direction detection device 100 according to one embodiment of the present invention includes a capacitance detection unit 110 having at least two regions in which capacitances are changed at different times and a direction detection unit 120 configured to detect a movement direction by comparing the at least two regions in which the capacitances are changed.

As illustrated in FIGS. 2A and 2B, the capacitance detection unit 110 includes a dielectric layer 10, a first electrode layer 20 disposed on a first surface of the dielectric layer 10 and including a plurality of first electrode patterns 20a, 20b, 20c, and 20d disposed in a first direction and a second electrode layer 30 disposed on a second surface of the dielectric layer 10 opposite the first surface. Here, the second electrode layer 30 may be integrally formed, and the plurality of first electrode patterns 20a, 20b, 20c, and 20d may fully overlap the second electrode layer 30, and the dielectric layer 10 may be interposed between the plurality of first electrode patterns 20a, 20b, 20c, and 20d and the second electrode layer 30. In addition, although the four first electrode patterns 20a, 20b, 20c, and 20d are illustrated in the drawings, the number of the first electrode patterns 20a, 20b, 20c, and 20d is not limited thereto.

In the above-described capacitance detection unit 110, when a pressure is applied to the capacitance detection unit 110 from the outside, a capacitance of the dielectric layer 10 between the first electrode layer 20 and the second electrode layer 30 in a region in which the pressure is applied is changed. Here, the external pressure may be, for example, a person's foot. That is, in a case in which a person steps on and passes through the capacitance detection unit 110, a capacitance of the dielectric layer 10 is changed. Here, capacitances of at least two regions are changed at different times.

For example, after a capacitance in a first region in which the first electrode pattern 20a selected from among the plurality of first electrode patterns 20a, 20b, 20c, and 20d overlaps the second electrode layer 30 is changed at a first time (T1), a capacitance in a second region in which the first electrode pattern 20c selected from among the remaining first electrode patterns 20b, 20c, and 20d but not the first electrode pattern 20a overlaps the second electrode layer 30 is changed at a second time (T2>T1). That is, the first electrode pattern 20a corresponding to the first region is different from the first electrode pattern 20c corresponding to the second region.

Hereinafter, a method of detecting a movement direction will be described in detail below with reference to the accompanying drawings.

Figure 3:
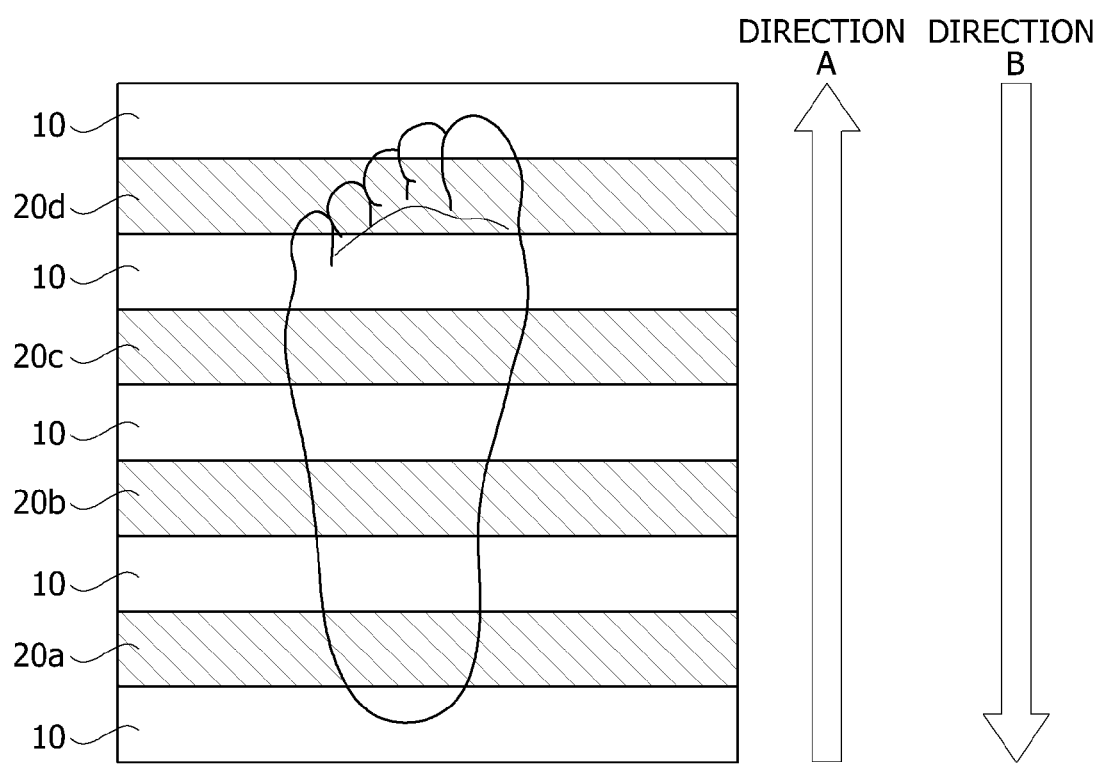
FIG. 3 is a plan view showing a movement direction.
Figure 4A:
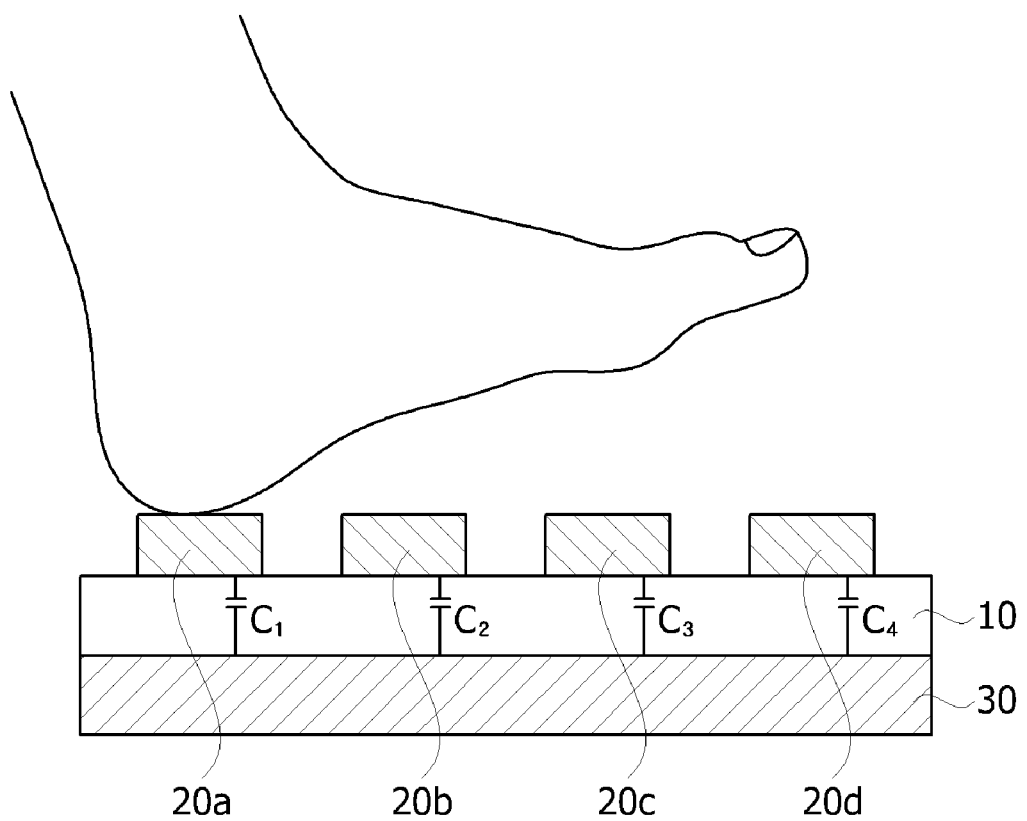
FIGS. 4A to 4D are cross-sectional views showing changes in capacitance according to a direction of FIG. 3.
Figure 4B:
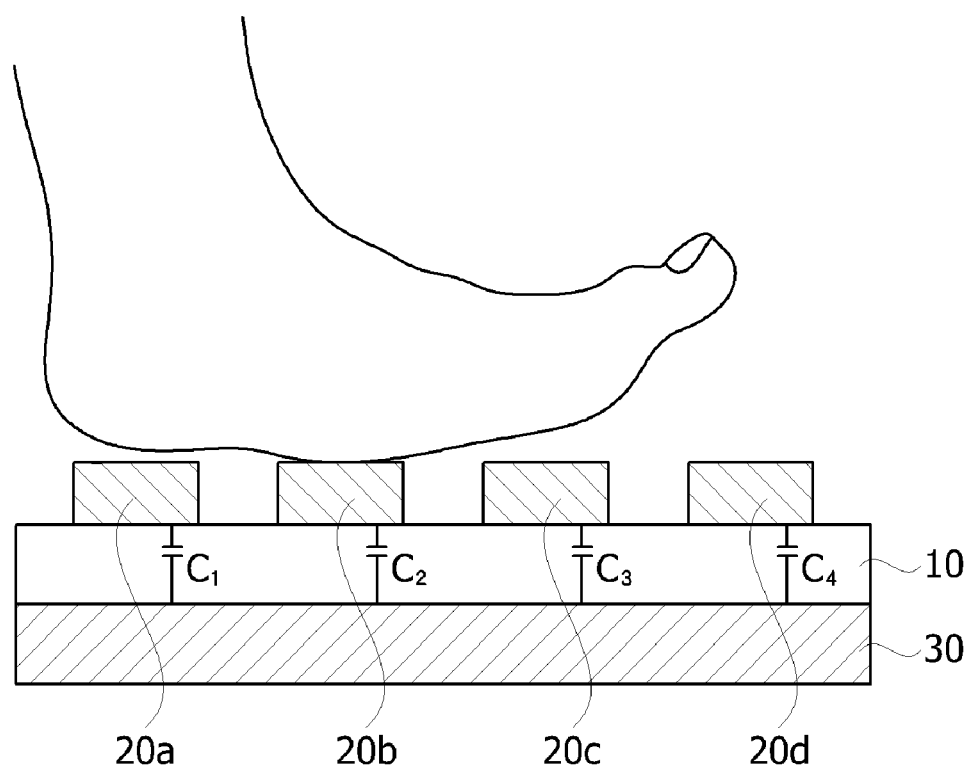
Figure 4C:
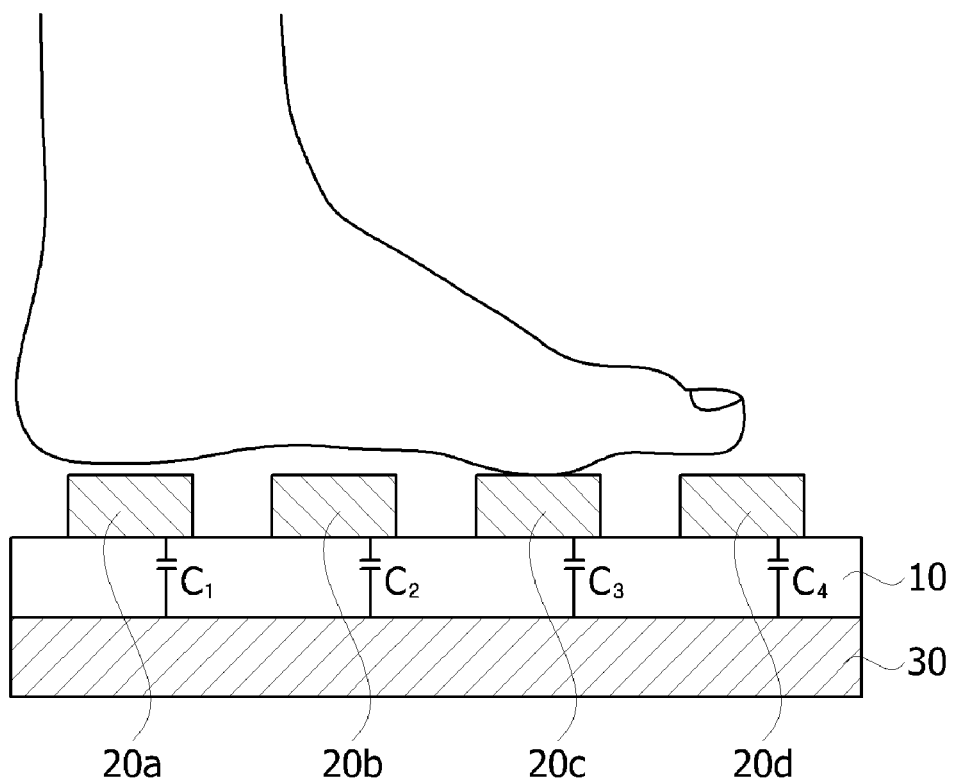
Figure 4D:
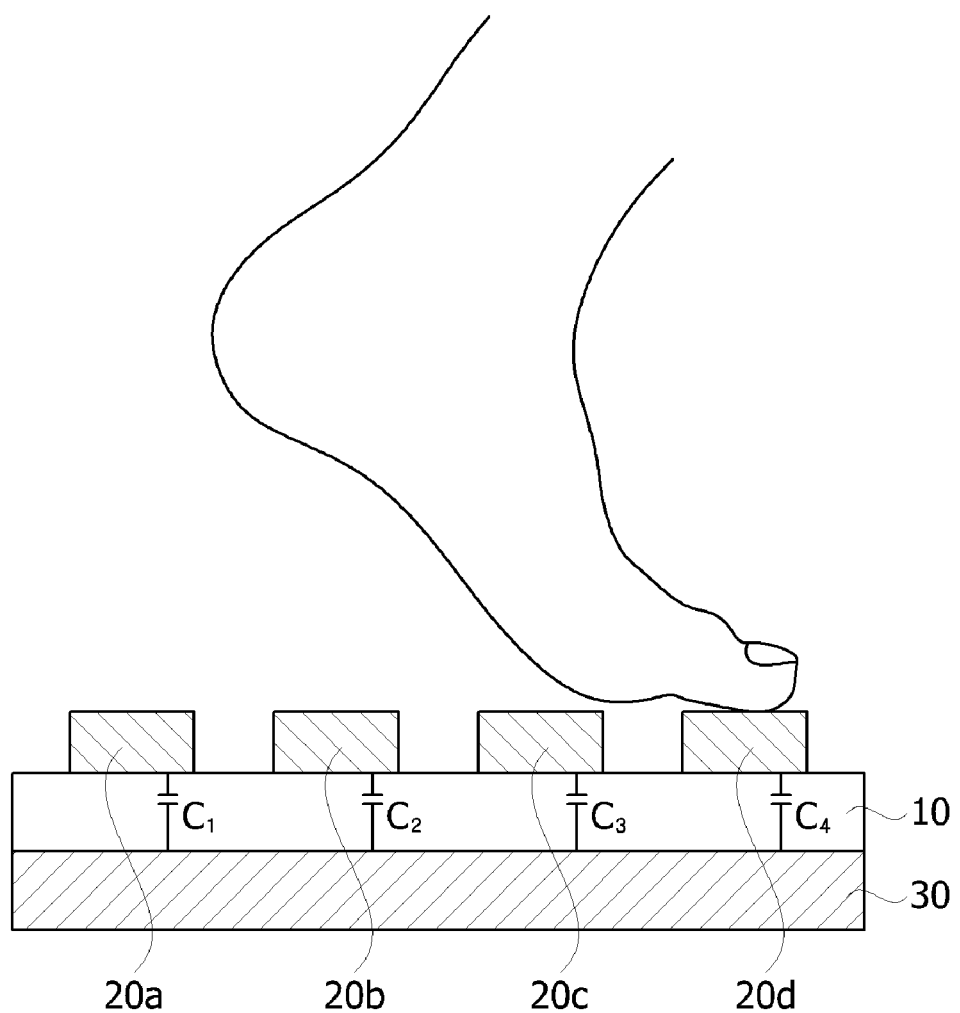
Figure 5:
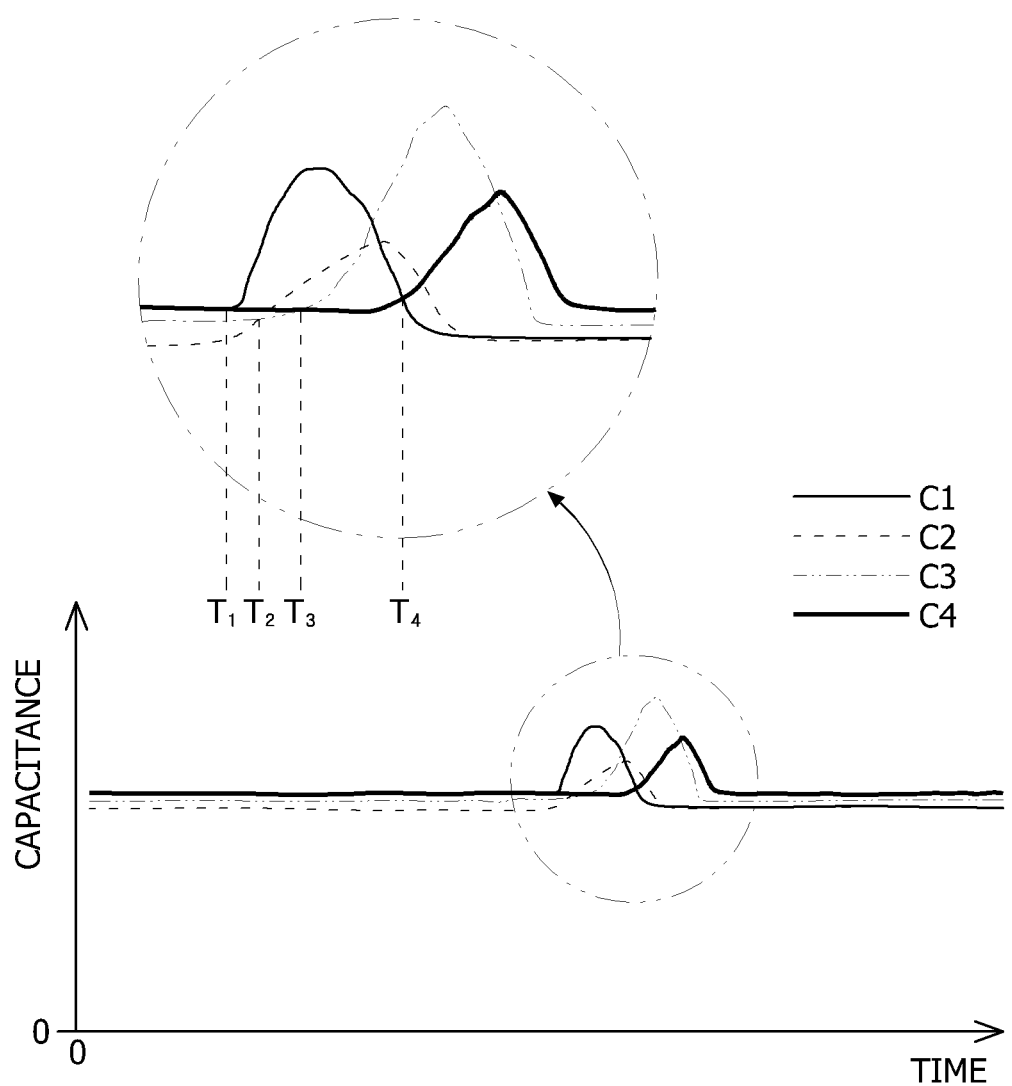
FIG. 5 is a graph showing the changes in capacitance of FIGS. 4A to 4D.

FIG. 3 is a plan view showing a movement direction, and FIGS. 4A to 4D are cross-sectional views showing changes in capacitance according to a direction of FIG. 3. In addition, FIG. 5 is a graph showing the changes in capacitance of FIGS. 4A to 4D.

As illustrated in FIG. 3, when a person passes the direction detection device and moves in direction A, the person may press on the capacitance detection unit 110. Here, a foot's sole of the person may press on four different first electrode patterns 20a, 20b, 20c, and 20d among the first electrode patterns 20a, 20b, 20c, and 20d, and in the drawings, four first electrode patterns 20a, 20b, 20c, and 20d are pressed sequentially.

That is, the first pattern 20a of the first electrode patterns, the second pattern 20b of the first electrode patterns, the third pattern 20c of the first electrode patterns, and the fourth pattern 20d of the first electrode patterns are pressed sequentially at different times.

Specifically, referring to FIGS. 4A to 4D and 5, a capacitance C1 of the dielectric layer 10 between the first pattern 20a of the first electrode patterns and second electrode layer 30 is changed at a time T1. In addition, a capacitance C2 of the dielectric layer 10 corresponding to a gap between the second pattern 20b of the first electrode patterns and the second electrode layer 30 is changed at a time T2 (T2>T1). Then, a capacitance C3 of the dielectric layer 10 between the third pattern 20c of the first electrode patterns and the second electrode layer 30 is changed at a time T3 (T3>T2), and finally, a capacitance C4 of the dielectric layer 10 between the fourth pattern 20d of the first electrode patterns and the second electrode layer 30 is changed at a time T4 (T4>T3).

In addition, the direction detection unit 120 connected to the capacitance detection unit 110 may receive information on the regions in which the capacitances are changed and determine that the person moved in a direction from the region in which the capacitance was changed first, that is, the first pattern 20a of the first electrode patterns, to the region in which the capacitance was changed last, that is, the fourth pattern 20d of the first electrode patterns.

That is, the capacitance detection unit 110 according to the embodiment of the present invention may determine a movement direction using information of at least two regions in which capacitances are changed. To this end, a person's foot has to apply pressure on at least two different first electrode patterns among the first electrode patterns 20a, 20b, 20c, and 20d.

Figure 6A:
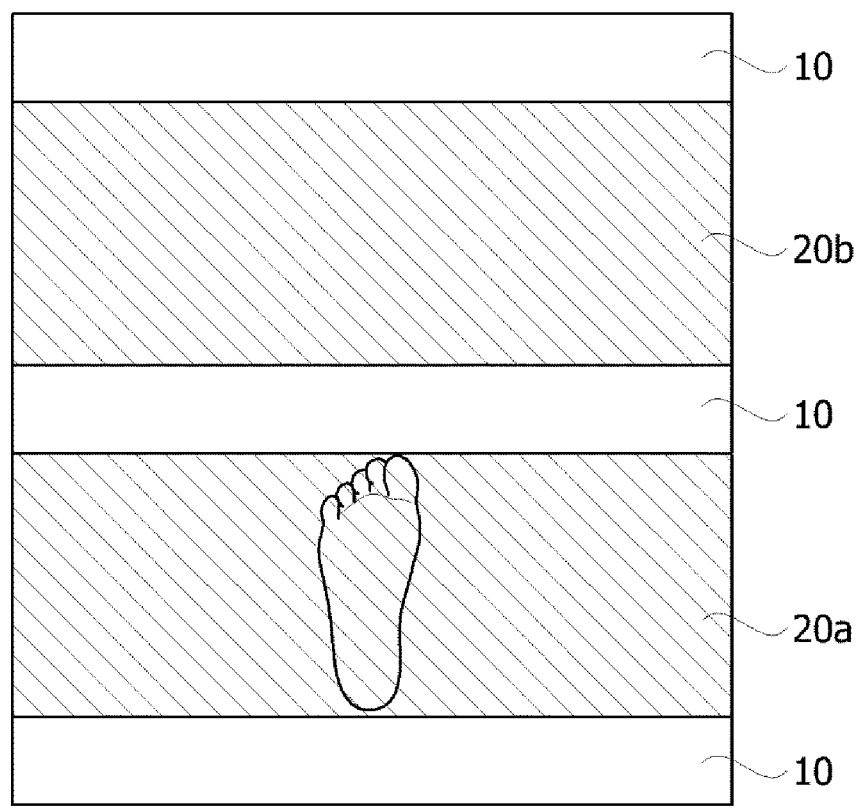
FIGS. 6A and 6B are plan views illustrating cases in which a movement direction is not detected.
Figure 6B:
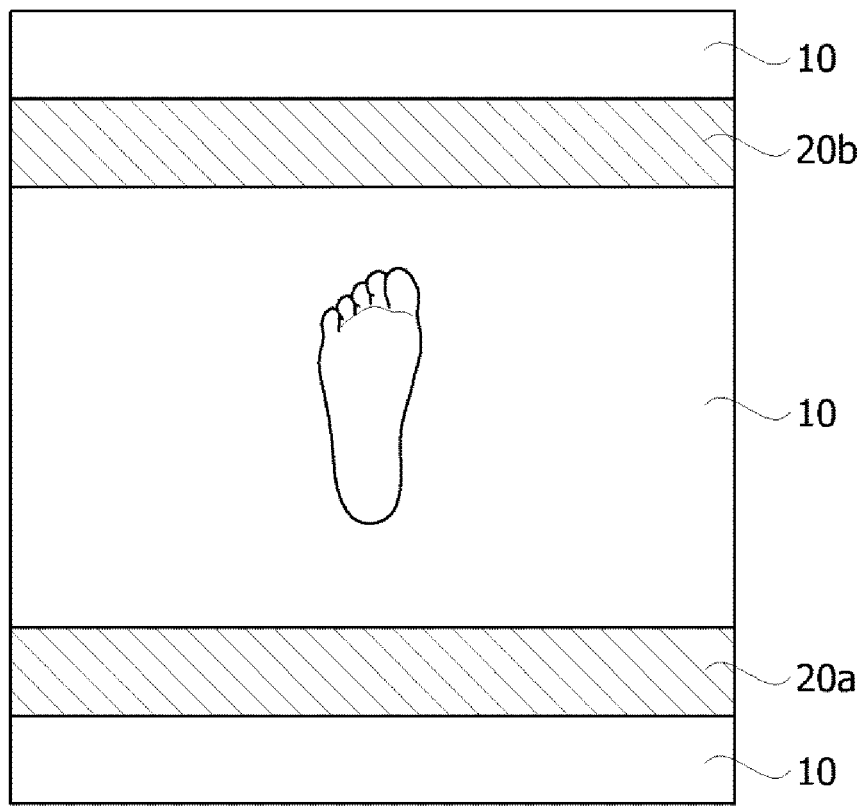

FIGS. 6A and 6B are plan views illustrating cases in which a movement direction is not detected.

As illustrated in FIG. 6A, in a case in which a length of a person's foot is narrow than a width of the first electrode pattern 20a, the person's foot presses on only one first electrode pattern 20a. Accordingly, a movement direction may not be detected. In addition, as illustrated in FIG. 6B, in a case in which a gap between the adjacent first electrode patterns 20a and 20b is too wide, since the person's foot only presses on the dielectric layer 10 between the first electrode patterns 20a and 20b, a capacitance is not changed. Accordingly, widths of the first electrode patterns 20a, 20b, 20c, and 20d and gaps between the adjacent first electrode patterns 20a, 20b, 20c, and 20d have values within predetermined ranges.

To this end, as illustrated in FIG. 2B, in comparison to a length of a person's foot, the widths of the first electrode patterns 20a, 20b, 20c, and 20d may be greater than or equal to 10 mm and less than 120 mm. In addition, gaps b between the adjacent first electrode patterns 20a, 20b, 20c, and 20d may be greater than or equal to 5 mm and less than 60 mm. Particularly, gaps c between two of first electrode patterns between which any one of the first electrode patterns 20a, 20b, 20c, and 20d is located may be less than 130 mm such that a person's foot presses on at least two first electrode patterns among the first electrode patterns 20a, 20b, 20c, and 20d.

In addition, since the dielectric layer 10 is to be restored after a pressure has been applied thereto, the dielectric layer 10 may include an elastic material. Particularly, in a case in which a thickness of the dielectric layer 10 has been decreased to 50% of the thickness and is not restored to the initial thickness within three seconds, it may be difficult to measure a changed capacitance value. That is, in a case in which a thickness of the dielectric layer 10 is too thin or thick, it may be difficult to measure a capacitance value or the dielectric layer 10 may not be restored because the dielectric layer 10 is deformed due to pressure. Accordingly, the thickness d of the dielectric layer 10 may range from 0.5 mm to 30 mm.

Particularly, widths of some of the plurality of first electrode patterns 20a, 20b, 20c, and 20d are different, or all widths of the plurality of first electrode patterns 20a, 20b, 20c, and 20d may be different. In addition, as illustrated in the drawings, all widths of the plurality of first electrode patterns 20a, 20b, 20c, and 20d may be the same. In addition, the first electrode patterns 20a, 20b, 20c, and 20d may have various shapes.

FIGS. 7A to 7E are plan views illustrating shapes of a first electrode pattern of FIG. 2A.

Figure 7A:
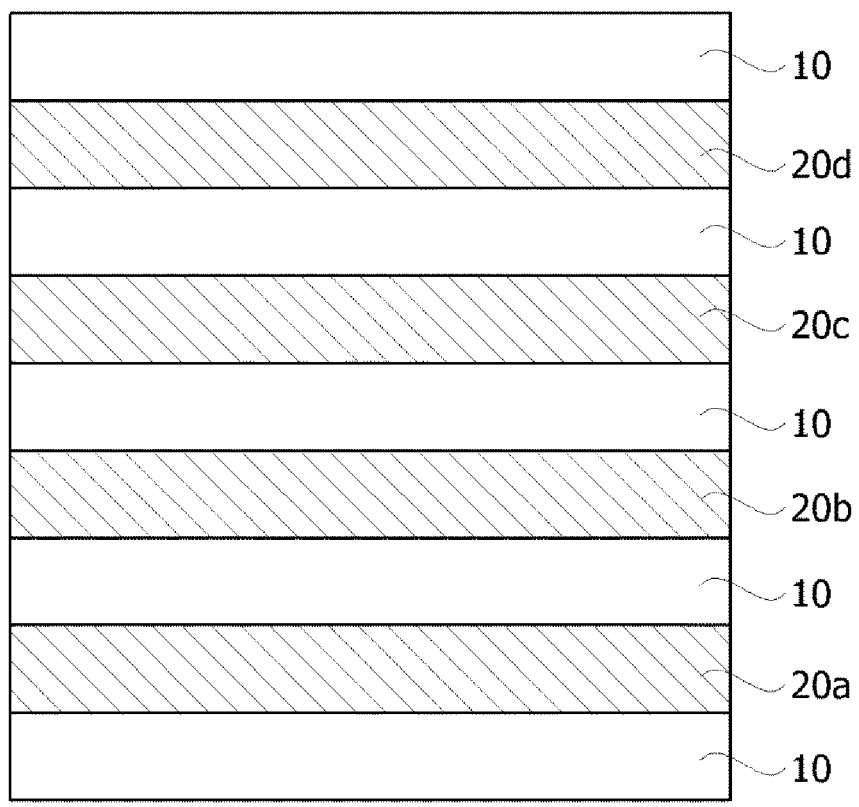
FIGS. 7A to 7E are plan views illustrating shapes of a first electrode pattern of FIG. 2A.
Figure 7B:
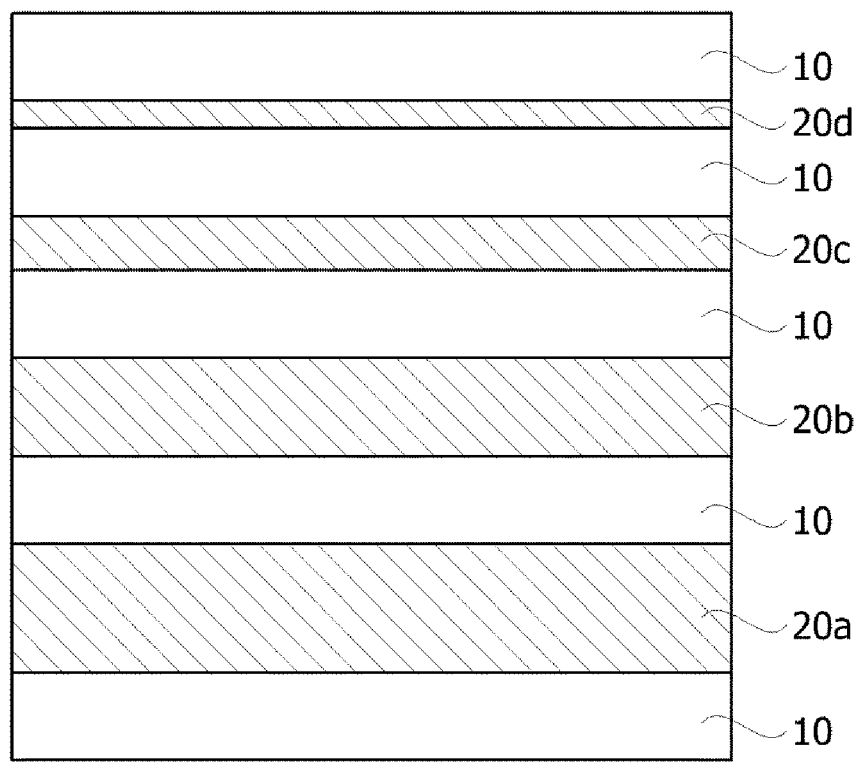

As illustrated in FIG. 7A, the first electrode patterns 20a, 20b, 20c, and 20d may each be formed in a rod shape having the same width, or as illustrated in FIG. 7B, the plurality of first electrode patterns 20a, 20b, 20c, and 20d may have different widths.

Figure 7C:
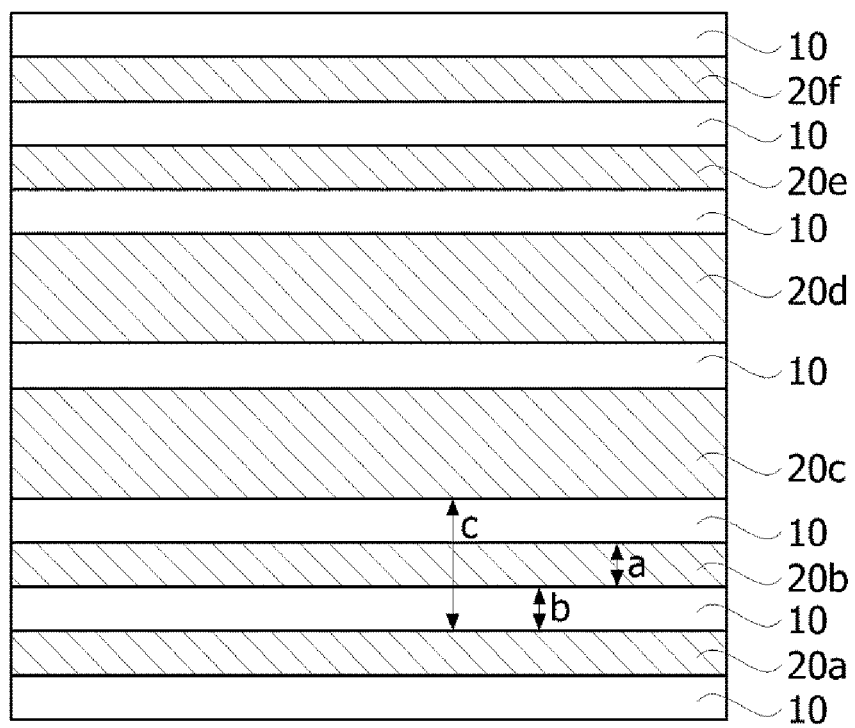

In addition, as illustrated in FIG. 7C, widths of the first electrode patterns 20a, 20b, 20e, and 20f in edge portions thereof and widths of the first electrode patterns 20c and 20d in a central portion of the capacitance detection unit may be different such that a foot's toe or heel may press on at least two different first electrode patterns among the first electrode pattern 20a, 20b, 20e, 20f even in a case in which a person steps on only an edge of the first electrode patterns 20a, 20b, 20e, and 20f.

Specifically, in a case in which the six first electrode patterns 20a, 20b, 20c, 20d, 20e, and 20f are disposed in the first direction, widths of the first, second, fifth, and sixth patterns 20a, 20b, 20e, and 20f of the first electrode patterns may be less than those of the third and fourth patterns 20c and 20d of the first electrode patterns. That is, in a case in which n (n is a natural number of two or more) first electrode patterns are disposed in the first direction, widths of a first, a second, a $n-1^{th}$ and nth patterns of the first electrode patterns are less than those of a third to $n-3^{th}$ patterns of the first electrode patterns.

Here, the widths a of the first, second, $n-1^{th}$, and $n^{th}$ patterns 20a, 20b, 20e, and 20f of the first electrode patterns may be greater than or equal to 10 mm and less than 30 mm. In addition, gaps b between the first pattern 20a of the first electrode patterns and the second pattern 20b of the first electrode patterns and between the $n-1^{th}$ pattern 20e of the first electrode patterns and the $n^{th}$ pattern 20f of the first electrode patterns may be greater than or equal to 5 mm and less than 15 mm. In addition, gaps c between the two of the first electrode patterns between which any one selected from among the first, second, $n-1^{th}$, and $n^{th}$ patterns 20a, 20b, 20e, and 20f patterns of the first electrode patterns is located are less than 40 mm.

Figure 7D:
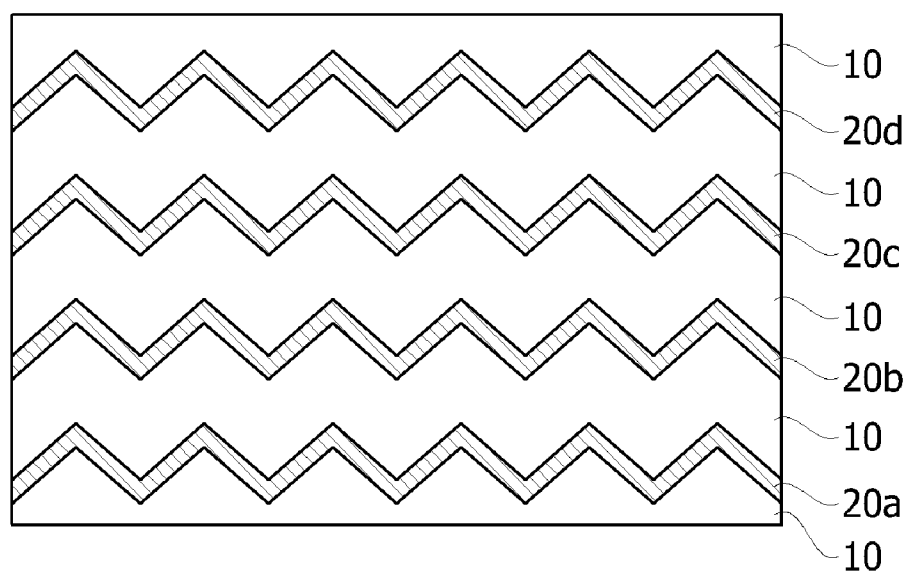
Figure 7E:
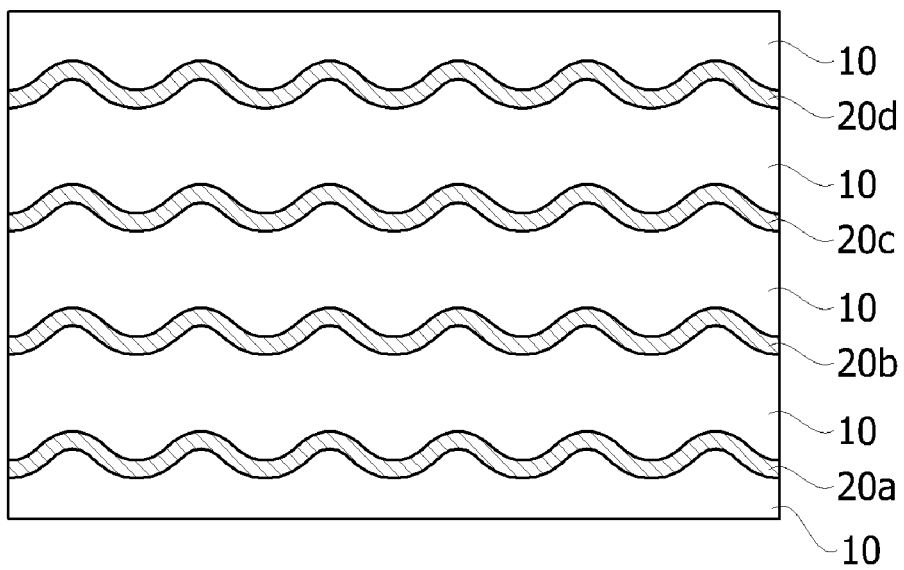

In addition, as illustrated in FIG. 7D, the first electrode patterns 20a, 20b, 20c, and 20d may be formed in a zigzag shape, or as illustrated in FIG. 7E, the first electrode patterns 20a, 20b, 20c, and 20d may be formed in a wave shape, and a shape of the first electrode patterns 20a, 20b, 20c, and 20d is not limited thereto.

In addition, the second electrode layer 30 may also include a plurality of second electrode patterns similar to the first electrode patterns 20a, 20b, 20c, and 20d.

Figure 8A:
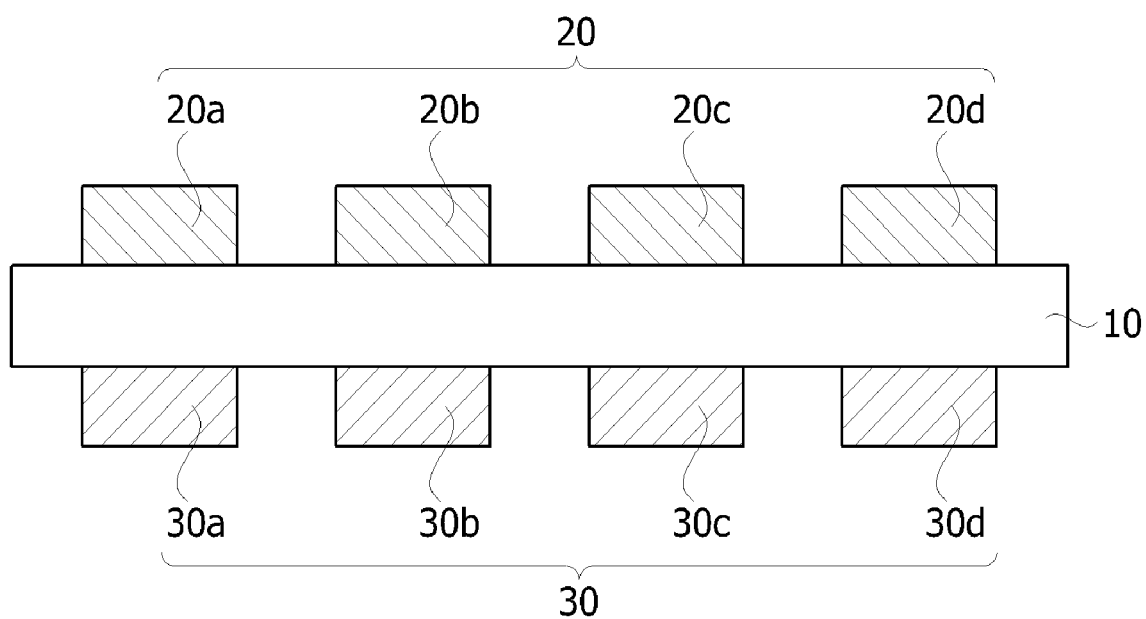
FIGS. 8A and 8B are cross-sectional views illustrating capacitance detection units according to another embodiment of the present invention.
Figure 8B:
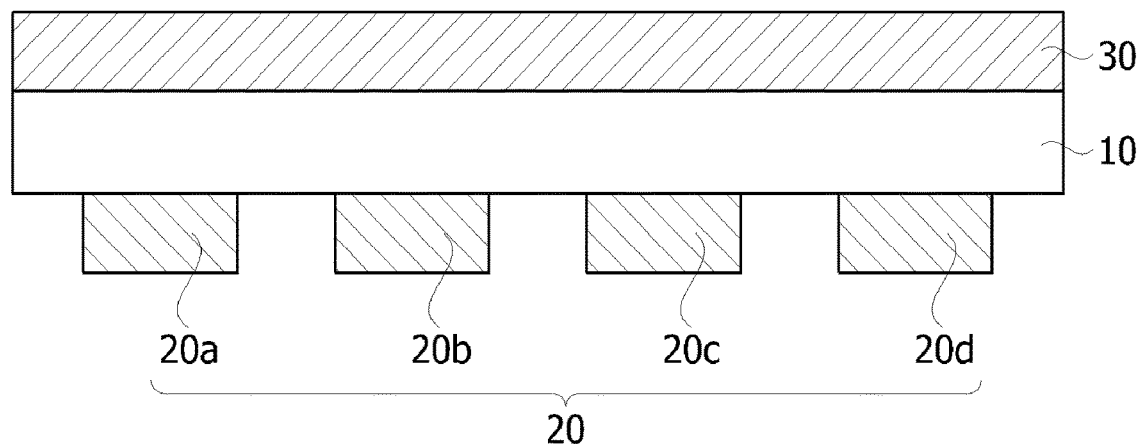

FIGS. 8A and 8B are cross-sectional views illustrating capacitance detection units according to another embodiment of the present invention.

As illustrated in FIG. 8A, a second electrode layer 30 may include a plurality of second electrode patterns 30a, 30b, 30c, and 30d disposed in a first direction in parallel to first electrode patterns 20a, 20b, 20c, and 20d. Here, widths of the second electrode patterns 30a, 30b, 30c, and 30d may be greater than or equal to 10 mm and less than 120 mm, which are the same as those of the first electrode patterns 20a, 20b, 20c, and 20d. The first electrode patterns 20a, 20b, 20c, and 20d may fully overlap the second electrode patterns 30a, 30b, 30c, and 30d and a dielectric layer 10 may be interposed between the first electrode patterns 20a, 20b, 20c, and 20d and the second electrode patterns 30a, 30b, 30c, and 30d.

In addition, although a first electrode layer 20 is disposed above the dielectric layer 10 in the drawings, as illustrated in FIG. 8B, the first electrode layer 20 may also be disposed below the dielectric layer 10, and the integrated second electrode layer 30 may also be disposed above the dielectric layer 10.

Hereinafter, a capacitance detection unit according to still another embodiment of the present invention will be specifically described below with reference to the accompanying drawings.

Figure 9A:
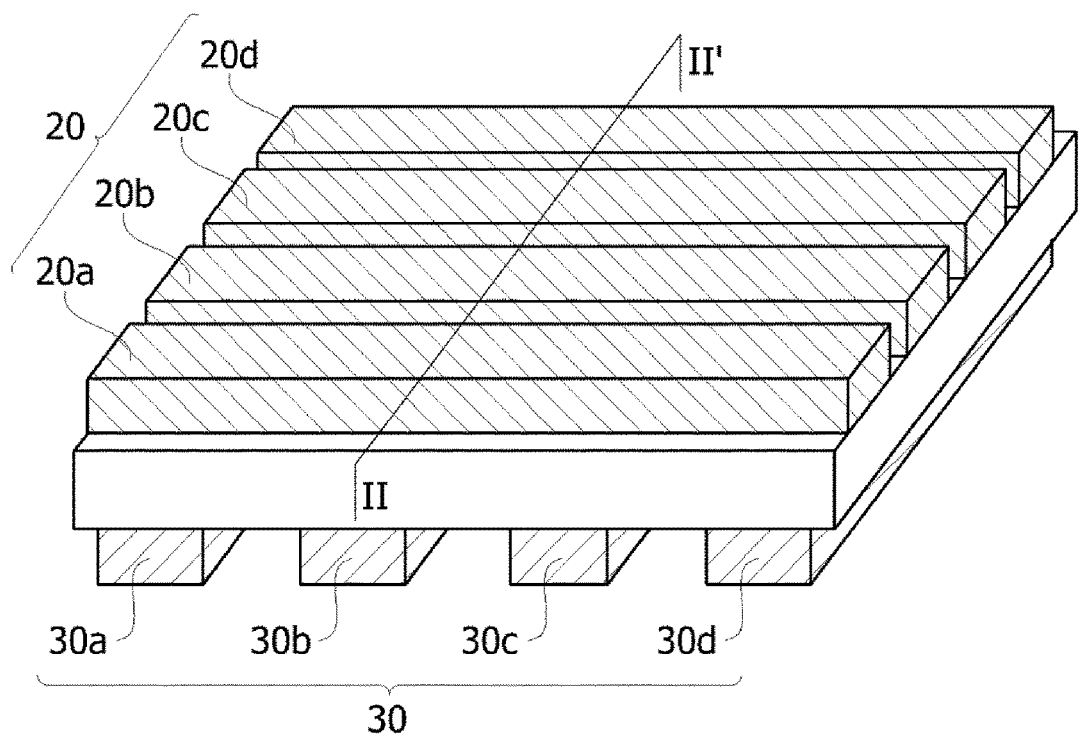
FIG. 9A is a perspective view illustrating a capacitance detection unit according to still another embodiment of the present invention.
Figure 9B:
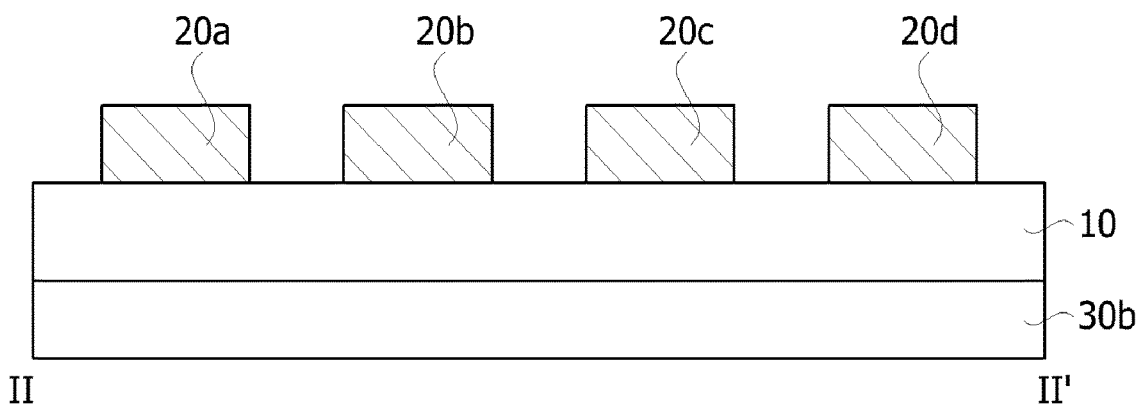
FIG. 9B is a cross-sectional view taken along line II-IF of FIG. 9A.
Figure 9C:
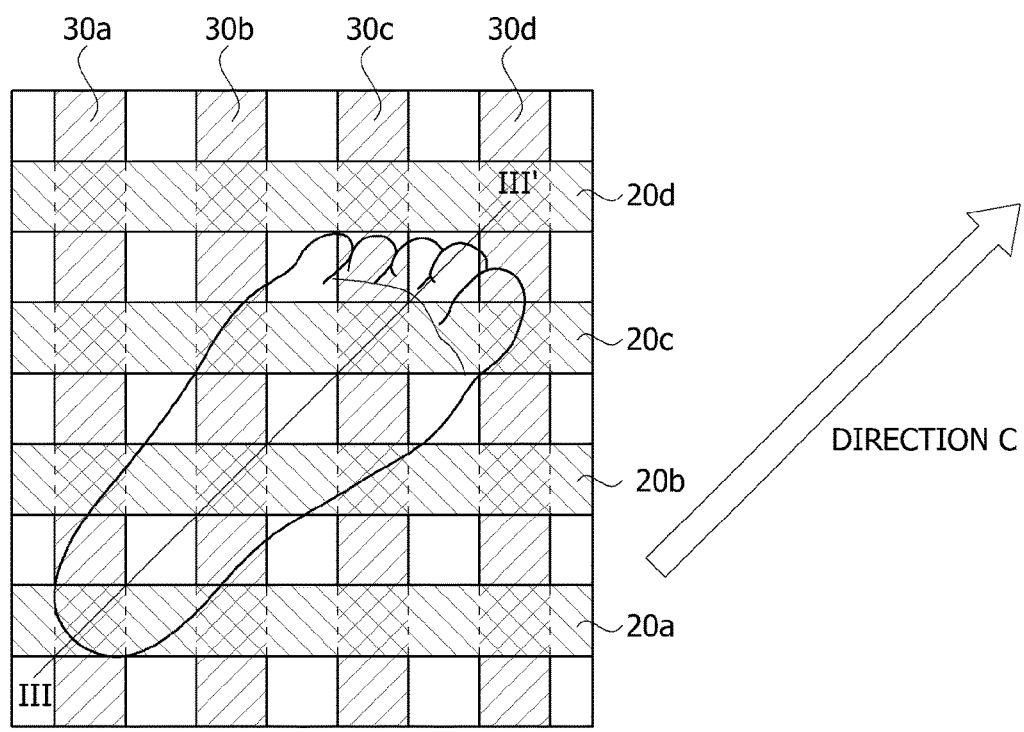
FIGS. 9C and 9D are views illustrating a direction detection method of FIG. 9A
Figure 9D:
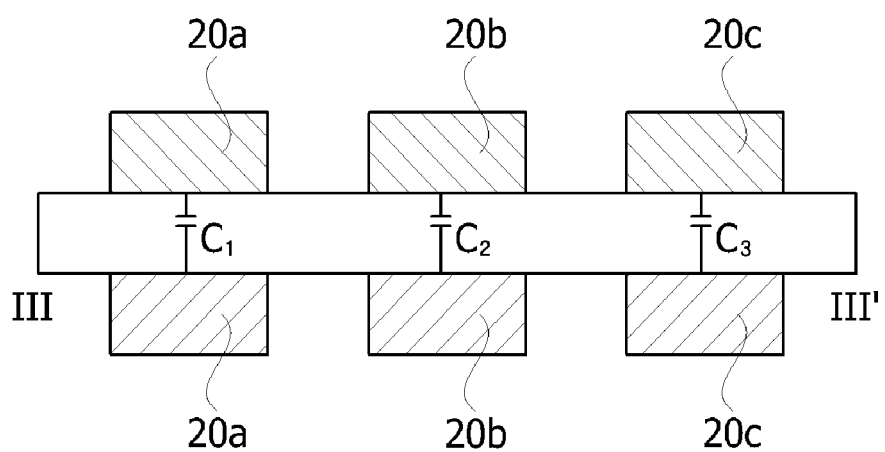

FIG. 9A is a perspective view illustrating a capacitance detection unit according to still another embodiment of the present invention, and FIG. 9B is a cross-sectional view taken along line II-IF of FIG. 9A. In addition, FIGS. 9C and 9D are views illustrating a direction detection method of FIG. 9A As illustrated in FIGS. 9A and 9B, first electrode patterns 20a, 20b, 20c, and 20d of a first electrode layer 20 may intersect with second electrode patterns 30a, 30b, 30c, and 30d of a second electrode layer 30, and a dielectric layer 10 may be interposed between the first electrode layer 20 and the second electrode layer 30. That is, the first electrode patterns 20a, 20b, 20c, and 20d may be disposed in a first direction, and the second electrode patterns 30a, 30b, 30c, and 30d may be disposed in a second direction which intersects with the first direction. In this case, movement in a diagonal direction may be detected.

That is, as illustrated in FIG. 9C, since the first electrode patterns 20a, 20b, 20c, and 20d intersects with the second electrode patterns 30a, 30b, 30c, and 30d, even in a case in which a person moves in direction C, capacitances C1, C2, and C3 are changed sequentially as illustrated in FIG. 9D. Accordingly, the movement of a person in a diagonal direction may be detected.

The direction detection device according to the embodiment of the present invention may be applied to various application fields.

Figure 10:
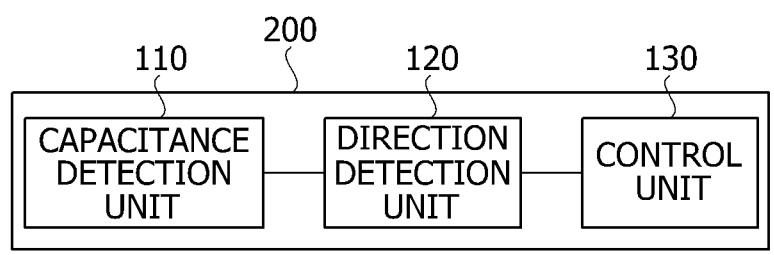
FIG. 10 is a block diagram illustrating an entering and leaving detection apparatus in which the direction detection device according to the present invention is applied.
Figure 11A:
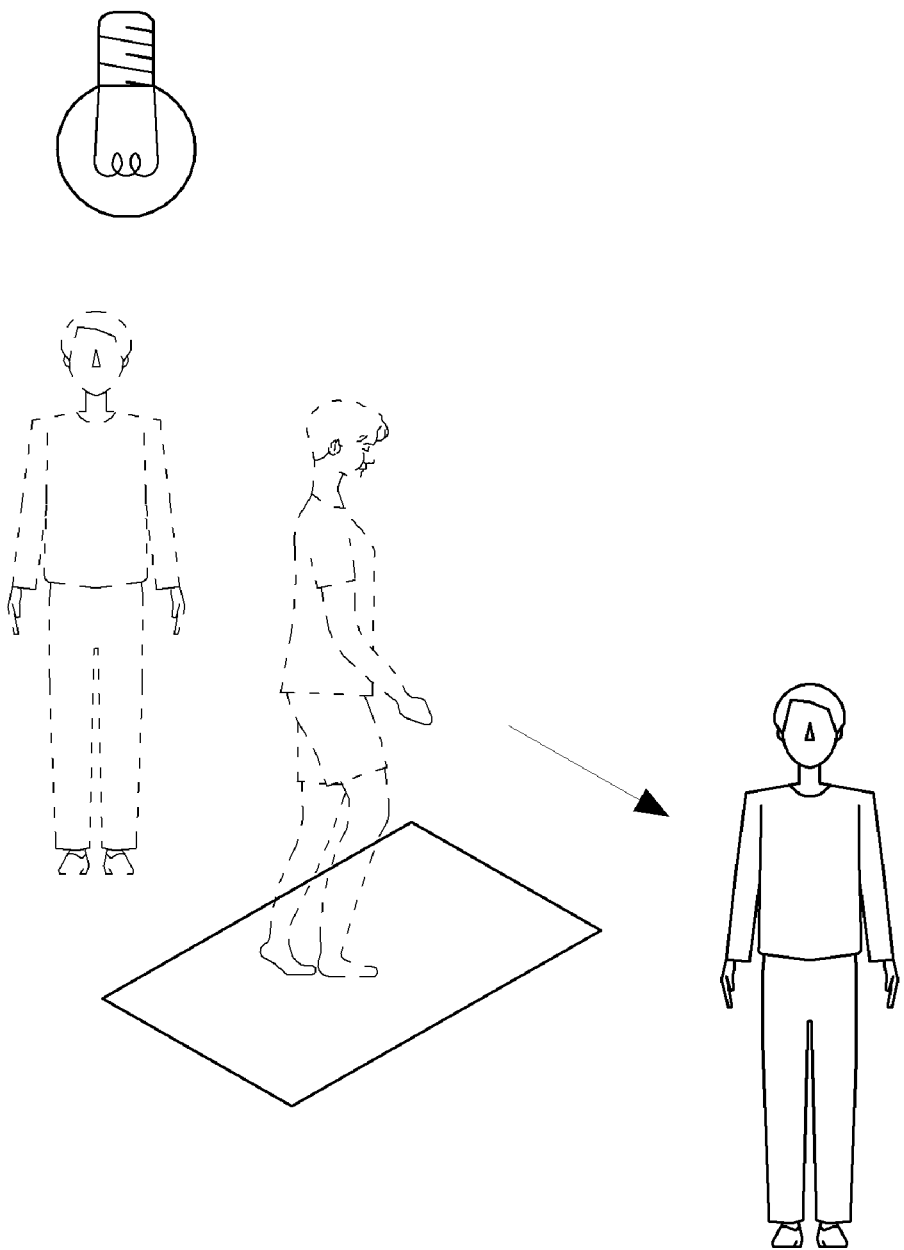
FIGS. 11A and 11B are views illustrating examples in which the entering and leaving detection apparatus of FIG. 10 is applied.
Figure 11B:
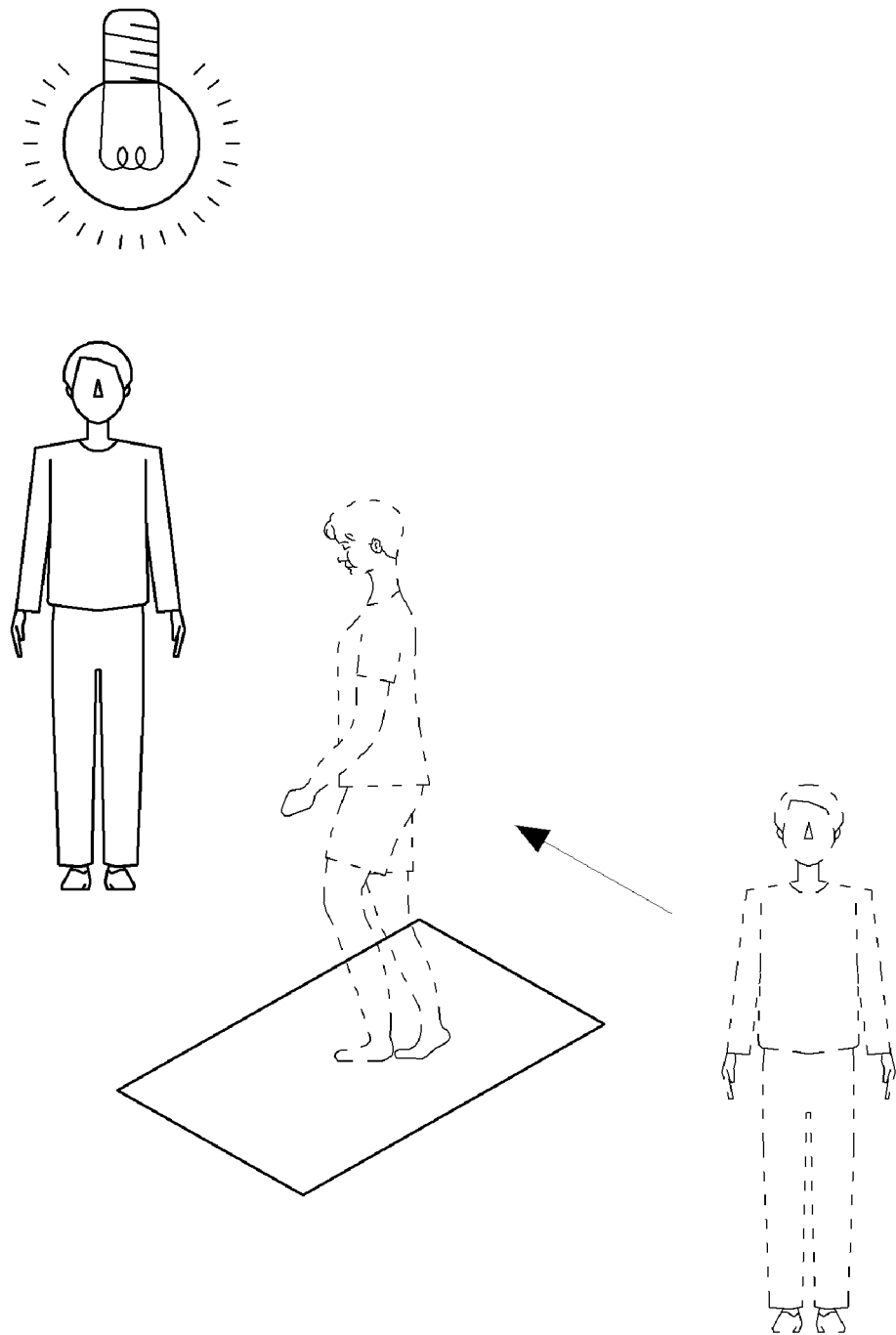

FIG. 10 is a block diagram illustrating an entering and leaving detection apparatus in which the direction detection device according to the present invention is applied. In addition, FIGS. 11A and 11B are views illustrating examples in which the entering and leaving detection apparatus of FIG. 10 is applied.

As illustrated in FIG. 10, an entering and leaving detection apparatus 200 includes a capacitance detection unit 110, a direction detection unit 120, and a control unit 130. For example, the capacitance detection unit 110 may be included in a mat or sheet, and the direction detection unit 120 and the control unit 130 may be included in an additional apparatus.

The capacitance detection unit 110 corresponds to the capacitance detection unit 110 illustrated in FIGS. 1 to 9. That is, the capacitance detection unit 110 includes a dielectric layer 10, a first electrode layer 20 disposed on the first surface of the dielectric layer 10 and including a plurality of first electrode patterns 20a, 20b, 20c, and 20d disposed in a first direction, and a second electrode layer 30 disposed on a second surface opposite the first surface of the dielectric layer 10, and capacitances of at least two regions in which the first electrode layer 20 overlaps the second electrode layer 30 are changed.

In addition, the direction detection unit 120 may be connected to the capacitance detection unit 110 and detect a movement direction by comparing times at which capacitances in the at least two regions are changed. In addition, the control unit 130 outputs a control signal according to a detected movement direction. Here, the control signal may be an alarm signal or lock signal.

Specifically, as illustrated in FIG. 10A, in a case in which the mat or sheet including the capacitance detection unit 110 is disposed in a front entrance and a person presses on the mat or sheet while leaving a room, capacitances in at least two regions of the capacitance detection unit 110 are changed. Then, the direction detection unit 120 may determine a movement direction of the person, that is, whether the person leaves the room, and the control unit 130 may shut off electricity, gas, and the like in a building.

Conversely, as illustrated in FIG. 10B, in a case in which a person presses on the mat or sheet while entering the room, capacitances in at least two regions of the capacitance detection unit 110 are changed. Then, the direction detection unit 120 may determine a movement direction of the person, that is, whether the person enters the room, and the control unit 130 may allow the person to use electricity, gas, and the like.

Particularly, the capacitance detection unit 110 may distinguish between an adult and a child according to an applied pressure, and a control signal may also vary accordingly. For example, in a case in which a child enters or leaves the room, the control signal may further include an age limitation for watching a television set (TV). In addition, in the entering and leaving detection apparatus, a first direction in which the first electrode patterns of the capacitance detection unit 110 may be disposed so as to intersect with a direction in which the person moves.

That is, as described above, the direction detection device according to the present invention can detect a movement direction of an abject by comparing at least two regions in which capacitances between first and second electrodes are changed at different times. In addition, the direction detection device according to the present invention distinguish between an adult and a child according to a pressure applied to the capacitance detection unit 110.

While the example embodiments of the present invention and their advantages have been described above in detail, it should be understood that various changes, substitutions and alterations may be made thereto without departing from the scope of the invention as defined by the following claims.

The invention claimed is:

1. A direction detection device comprising:
a capacitance detection unit provided at an entrance to a room, the capacitance detection unit including a dielectric layer, a first electrode layer provided on a first surface of the dielectric layer and including a plurality of first electrode patterns provided in a first direction that intersects a movement direction of a user through the entrance, and a second electrode layer provided on a second surface of the dielectric layer opposite the first surface, and configured to detect changes in capacitance at different times in a first region in which at least one selected from among the plurality of first electrode patterns overlaps the second electrode layer and in a second region in which at least one selected from among remaining ones of the plurality of first electrode patterns overlaps the second electrode layer; and a controller connected to the capacitance detection unit and configured to detect the movement direction of the user with respect to the entrance of the room based on the different times between the first region and the second region.

2. The direction detection device of claim 1, wherein the controller compares the first region in which the capacitance was changed at a first time (T1) and the second region in which the capacitance was changed at a second time (T2>T1) and determines that the user moved from the first region toward the second region.

3. The direction detection device of claim 1, wherein capacitances of at least two regions in the capacitance detection unit are changed, and the at least two regions overlap different first electrode patterns.

4. The direction detection device of claim 3, wherein the controller determines that the user moved from a region of the at least two regions in which the capacitance was changed first to a region thereof in which the capacitance was changed last.

5. The direction detection device of claim 1, wherein the first electrode pattern has a rod shape, a zigzag shape, or a wave shape.

6. The direction detection device of claim 1, wherein respective widths of the plurality of first electrode patterns are equal.

7. The direction detection device of claim 1, wherein widths of at least some of the plurality of first electrode patterns are different.

8. The direction detection device of claim 1, wherein a width of the first electrode pattern is equal to or greater than 10 mm and less than 120 mm.

9. The direction detection device of claim 1, wherein a gap between the adjacent first electrode patterns is equal to or greater than 5 mm and less than 60 mm.

10. The direction detection device of claim 1, wherein n (n being a natural number) of the plurality of first electrode patterns are provided in the first direction, and widths of a first, a second, an n−1th, and an $n^{th}$ patterns of the first electrode patterns are less than those of a third to an $n-3^{th}$ patterns of the first electrode patterns.

11. The direction detection device of claim 1, wherein the second electrode layer includes a plurality of second electrode patterns provided in the first direction.

12. The direction detection device of claim 1, wherein the second electrode layer includes a plurality of second electrode patterns provided in a second direction that intersects the first direction.

13. The direction detection device of claim 1, wherein the second electrode layer is integrally formed in one piece.

14. An apparatus comprising:
a capacitance detection unit mat provided at an entrance to a room, the capacitance detection unit including a dielectric layer, a first electrode layer provided on a first surface of the dielectric layer and including a plurality of first electrode patterns provided in a first direction that intersects a movement direction of a user through the entrance, and a second electrode layer provided on a second surface of the dielectric layer opposite the first surface, and configured to detect changes in capacitance at different times in a first region in which at least one selected from among the plurality of first electrode patterns overlaps the second electrode layer and in a second region in which at least one selected from among remaining ones of the plurality of first electrode patterns overlaps the second electrode layer; and
a controller connected to the capacitance detection unit and configured to:
detect the movement direction of the user with respect to the entrance of the room based on the different times between the first region and the second region; and
output a control signal based on the movement direction.

15. The apparatus of claim 14, wherein the control signal includes an alarm signal or lock signal.

16. A device, comprising:
a capacitance detection unit including a dielectric layer, a first electrode layer provided on a first surface of the dielectric layer and including a plurality of first electrode patterns provided in a first direction, and a second electrode layer provided on a second surface of the dielectric layer opposite the first surface, and configured to detect changes in capacitance at different times in a first region in which at least one selected from among the plurality of first electrode patterns overlaps the second electrode layer and in a second region in which at least one selected from among remaining ones of the plurality first electrode patterns overlaps the second electrode layer; and
a controller connected to the capacitance detection unit and configured to detect a movement direction based on the different times between the first region and the second region,
wherein a quantity n (n being a natural number) of the plurality of first electrode patterns are provided in the first direction, and widths of a first, a second, an n−1th, and an $n^{th}$ patterns of the first electrode patterns are less than those of a third to an $n-3^{th}$ patterns of the first electrode patterns.

17. The device of claim 16, wherein the controller is further configured to output a control signal to another device based on the movement direction.

18. The device of claim 17, wherein the controller is further configured to determine an age of the user based a pressure applied by the user on the capacitance detection unit and vary the control signal based on the age of the user.

19. The device of claim 16, wherein:
capacitances of at least two regions in the capacitance detection unit are changed, and the at least two regions overlap different first electrode patterns, and
the controller is further configured to determine that an object moved from a region of the at least two regions in which the capacitance first was changed to a region thereof in which the capacitance was last changed.

20. The direction detection device of claim 16, wherein widths of the electrode patterns and of gaps between the adjacent first electrode patterns are less than a length of a foot of the user.

* * * * *